(12) United States Patent
Abicht et al.

(10) Patent No.: US 10,030,462 B2
(45) Date of Patent: Jul. 24, 2018

(54) CONTROL AND SUPPLY UNIT

(71) Applicant: ONESUBSEA IP UK LIMITED, London (GB)

(72) Inventors: Daniel Abicht, Magdeburg (DE); Reinhard Thies, Allershel (DE); Joachim Keese, Hannover (DE); Florian Tegt, Fassberg (DE); Harald Schumacher, Wunstorf (DE)

(73) Assignee: OneSubsea IP UK Limited (GB)

( * ) Notice: Subject to any disclaimer, the term of this patent is extended or adjusted under 35 U.S.C. 154(b) by 564 days.

(21) Appl. No.: 13/622,220

(22) Filed: Sep. 18, 2012

(65) Prior Publication Data

US 2013/0019964 A1   Jan. 24, 2013

Related U.S. Application Data

(63) Continuation of application No. PCT/EP2010/001724, filed on Mar. 18, 2010.

(51) Int. Cl.
*F16K 47/02* (2006.01)
*E21B 33/035* (2006.01)

(52) U.S. Cl.
CPC ........ *E21B 33/035* (2013.01); *E21B 33/0355* (2013.01); *F16K 47/023* (2013.01); *Y10T 137/7722* (2015.04)

(58) Field of Classification Search
CPC ...... Y10T 137/7761–137/777; E21B 33/0355; G05D 16/02; F16K 47/02; F16K 47/023; F16K 47/026
USPC .......................................... 137/487.5–492.5
See application file for complete search history.

(56) References Cited

U.S. PATENT DOCUMENTS

| 5,166,677 | A | | 11/1992 | Schoenberg |
| 5,519,295 | A | * | 5/1996 | Jatnieks ......................... 318/453 |
| 5,587,707 | A | * | 12/1996 | Dickie et al. ............ 340/870.09 |
| 5,669,419 | A | * | 9/1997 | Haas .................... G05D 7/0635 137/486 |
| 6,056,008 | A | * | 5/2000 | Adams ............... G05D 16/2093 137/487.5 |
| 6,161,618 | A | | 12/2000 | Parks et al. |
| 6,250,199 | B1 | * | 6/2001 | Schulte et al. .................. 91/4 R |
| 6,281,489 | B1 | | 8/2001 | Tubel et al. |
| 6,281,498 | B1 | * | 8/2001 | Fellows ................... 250/339.06 |
| 6,420,976 | B1 | | 7/2002 | Baggs et al. |

(Continued)

FOREIGN PATENT DOCUMENTS

| WO | 2004020785 A1 | 3/2004 |
| WO | 2005078233 A1 | 8/2005 |

(Continued)

OTHER PUBLICATIONS

International Application No. PCT/EP2010/001724 Search Report and Written Opinion dated Sep. 21, 2010.

(Continued)

*Primary Examiner* — William McCalister
(74) *Attorney, Agent, or Firm* — Conley Rose, P.C.

(57) ABSTRACT

A control and supply unit for an actuating device of a choke, a valve, a blow-out preventer or some other device applied in the field of oil and natural gas production. The control and supply unit includes a vibration detection means to detect vibrations caused by a conveyed flow. The conveyed flow can be controlled by the actuating device.

21 Claims, 1 Drawing Sheet

(56) References Cited

U.S. PATENT DOCUMENTS

| | | | |
|---|---|---|---|
| 6,998,724 B2* | 2/2006 | Johansen et al. | 290/1 R |
| 7,642,926 B2* | 1/2010 | Liberale et al. | 340/853.3 |
| 2003/0102720 A1 | 6/2003 | Baggs et al. | |
| 2004/0216884 A1 | 11/2004 | Bodine et al. | |
| 2004/0262008 A1 | 12/2004 | Deans et al. | |
| 2004/0262998 A1 | 12/2004 | Kunow et al. | |
| 2005/0029476 A1 | 2/2005 | Biester et al. | |
| 2005/0241697 A1* | 11/2005 | Ohmi | F16K 47/02 137/487.5 |
| 2007/0107777 A1* | 5/2007 | Catron | G05D 7/0635 137/2 |
| 2009/0038805 A1 | 2/2009 | Parks et al. | |
| 2009/0255587 A1* | 10/2009 | Ohmi | F16K 47/02 137/2 |
| 2009/0277644 A1 | 11/2009 | McStay et al. | |

FOREIGN PATENT DOCUMENTS

| | | |
|---|---|---|
| WO | 2008125136 A1 | 10/2008 |
| WO | 2008125137 A1 | 10/2008 |
| WO | 2008145160 A1 | 12/2008 |
| WO | 2011060802 A1 | 5/2011 |

OTHER PUBLICATIONS

International Application No. PCT/EP2010/001725 Search Report and Written Opinion dated Sep. 29, 2010.

* cited by examiner

CONTROL AND SUPPLY UNIT

This application is a continuation of and claims priority to International Patent Application No. PCT/EP2010/001724, filed Mar. 18, 2010, entitled "Control and Supply Unit", which is hereby incorporated by reference in its entirety.

STATEMENT REGARDING FEDERALLY SPONSORED RESEARCH OR DEVELOPMENT

Not applicable.

BACKGROUND

The present disclosure relates to a control and supply unit for an actuating device of a choke, a valve, a blow-out preventer or some other device applied in the field of oil and natural gas production. For further reference to actuating devices and power supply devices of the type discussed herein, see PCT/EP2007/003307, PCT/EP2007/003308, PCT/EP2007/004793, PCT/EP2003/09696, and PCT/EP 2009/008249, the disclosures of which are incorporate herein by reference.

SUMMARY

An embodiment of the control and supply unit comprises at least an auxiliary power supply, which is especially rechargeable, and a connecting means used for an exchange of data and/or for the purpose of voltage supply. The control and supply unit is for an actuating device of, for example, a choke, a valve, a blow-out preventer or a similar device. The actuating device is normally accommodated in a housing and the control and supply unit may be arranged in said housing as well. It may, however, be of advantage when the unit in question is implemented separately from the actuating device. This makes it more easily accessible, for example for maintenance purposes.

Such application devices can be arranged on the seabed, where they may also constitute part of a so-called tree. In particular in the case of electrically operated actuating devices for such application devices, a connecting means for connecting a voltage supply is required. In addition, the actuating device is normally controlled and monitored with the aid of a respective connecting means for an exchange of data. Data may be exchanged with a unit, which is arranged above the sea level, through a cable connection. Additionally, the voltage supply may be achieved through such a cable connection or, like the exchange of data, from a submarine control module.

By means of the actuating device, a conveyed flow of oil or natural gas through respective pipes is controlled. During this conveyed flow, vibrations may occur in particular in the actuating device. These vibrations result from, for example, the wear of the respective application device, such as a choke, a valve or a blow-out preventer. If the wear exceeds a certain degree, also the strength of the vibrations will increase, so that the vibrations can be used as a measure for judging the condition and the operability of the actuating device in question or of the application device associated therewith.

An aspect of the present disclosure is to improve a control and supply unit insofar as information on the operability of the actuating device or of the application device can be provided in a simple structural way.

According to the present disclosure, a vibration detection means is connected to the control and supply unit, said vibration detection means being used for detecting vibrations caused by a conveyed flow, which can be controlled by the actuating device. The vibrations are evaluated, for example, with respect to their amplitudes and/or frequencies, and are then used for drawing conclusions especially with respect to an amount of wear of the actuating device or of the respective application device. As soon as the amplitudes of the vibrations exceed a specific value or as soon as there is an increase in specific frequencies in the frequency spectrum of the vibrations, the actuating device will be, for example, switched off and/or the respective application device will be reset to a position at which the conveyed flow is interrupted.

The vibration detection means may comprise various components, such as an evaluation unit, a data interface and a voltage supply connection. In particular, the vibration detection means comprises at least one vibration sensor. It is also possible that the means comprises only a vibration sensor and all the other components of the vibration detection means are provided by some other component of the control and supply unit.

The respective vibration sensor may be arranged on the control and supply unit, the actuating device or the application device, and especially at a location at which the vibrations in question can be detected in an advantageous manner. It is, in particular, possible that the vibration sensor is associated with a component of the control and supply unit and is additionally arranged on said component or constitutes a part thereof. This has the effect that the vibrations in question are detected directly at this component and within the control and supply unit. The other components of the control and supply unit can be used for the purpose of voltage supply, evaluation and the like with respect to the vibration sensor or the vibration detection means.

It may also be advantageous when the vibration sensor or the vibration sensor and an additional vibration sensor are associated with the actuating device.

Other possibilities of arrangement are obtained, when the vibration sensor is associated with a plug connection module or when the vibration sensor is, for example, part of a supply and communication assembly of the control and supply unit.

If more than one vibration sensor is used, the vibrations that are detected more than once can be compared with one another, so as to possibly detect different grounds for the vibrations or the distribution of vibrations.

A vibration sensor of the type in question can be configured for detecting vibrations in the direction of three axes which are arranged at right angles to one another. It is also possible to provide a vibration sensor for each of these axes.

Depending on the respective requirements, the vibration sensor can be configured for cyclic and/or sequential interrogation.

When the control and supply unit comprises at least an auxiliary power supply, which is especially rechargeable, and a connecting means used for an exchange of data and/or for the purpose of voltage supply, a respective vibration sensor can be supplied with voltage by the control and supply unit, and the detected data can be transmitted via the control and supply unit to a respective external location.

The data can be transmitted in the form of raw data, without further evaluation of the vibrations, or in a form in which a qualified evaluation of the vibrations has already taken place.

The connecting means can be connected via a cable connection to a separate plug connection module arranged on the actuating device. This plug connection module serves to directly connect thereto a respective external cable connection used for transmitting electric power or for an exchange of data.

Due to the fact that the plug connection module is separated from the rest of the control and supply unit, the plug connection module can be arranged at an advantageous location at which it can be contacted from outside more easily and without damage being caused to the rest of the control and supply unit. In addition, due to the fact that the plug connection module is arranged on the actuating device, an arrangement is obtained that is more stable than an arrangement in which the respective plug connection module is arranged directly on the control and supply unit. Depending on the requirements to be satisfied, the plug connection module can be arranged at a suitable location and with a suitable orientation.

The cable connection is then used for connecting the plug connection module to the connecting means. A respective connection to the actuating device can be established easily by means of the control and supply unit. This control and supply unit can also satisfy relevant standards, such as the Subsea Instrumentation Interface Standardisation (SIIS); these standards especially refer to the connection of control systems to a respective sensor of the actuating device.

The control and supply unit according to the present disclosure has a compact structural design and satisfies all the demands on an arrangement, especially a submarine arrangement, on the seabed or on a tree.

According to one embodiment of the plug connection module, said plug connection module may comprise a connection housing and at least one plug connection device. The connection housing serves to arrange the module directly on the actuating device.

Via the plug connection device, a suitable cable connection for supplying electric power and for an exchange of data can be connected. This cable connection is connected to the rest of the control and supply unit via the additional, above-mentioned cable connection.

For easily transmitting electric power or data from plug connection module as well as from the rest of the control and supply unit to the actuating device, a coupling means for transmitting electric power and/or data can be implemented between the connection housing and the actuating device.

According to one embodiment of the present disclosure, the connection housing can be secured to the outer side of the housing of the actuating device, in particular such that it is releasable therefrom. It is, however, also possible that the connection housing is releasably secured to other parts of the actuating device or other units for mounting the actuating device on the seabed or on a tree.

Taking all this into account, a high variability of the arrangement of the plug connection module with respect to the actuating device and the rest of the control and supply unit is obtained.

According to one embodiment of the present disclosure, the actuating device can have power supplied thereto directly via the plug connection module. At the same time, this plug connection module can also be used for supplying electric power to the rest of the control and supply unit, and in particular for supplying the respective electronic components or for recharging the rechargeable auxiliary power supply.

In this connection, the plug connection module can be connected to an external control module also directly on the seabed or to a remotely controlled vehicle. Such a remotely controlled vehicle is, for example, a so-called remote operated vehicle (ROV), or autonomous underwater vehicle (AUV), wherein in the following "ROV" may be replaced by "AUV".

For reasons of redundancy, it is additionally of advantage when the actuating device has associated therewith two control and supply units and/or a plug connection module with two plug connection devices.

In connection with the ROV, it may additionally be of advantage to configure the plug connection module for connection of an ROV voltage supply line and/or an ROV vehicle data line for supply with electric power by and for an exchange of data with the ROV. In this way, it is not only possible to mechanically bridge or interrupt the connection between the control and supply unit and the actuating device through for example the ROV, but the supply can also be effected by for example the ROV, instead of the control and supply unit. Such an interruption of the connection between the control and supply unit and the actuating device can be effected when, for example, the control and supply unit is no longer able to supply and control the actuating device. In this case, a substitute external supply and control of the actuating device is effected by the ROV.

In the case of such an external supply and control, it will be particularly advantageous when the ROV itself is provided with suitable control and supply possibilities or provides the same by an external setup.

In this connection, it can also be regarded as advantageous when the unit comprises a unit housing which is releasably secured to the actuating device.

The unit housing may contain a plurality of means, and at least the communication interface, the auxiliary power supply and the motor control unit are arranged in the unit housing.

In order to satisfy especially level 2 of the SIIS regulation, the field bus can be a CAN bus. Such a bus is a standardized, real-time field bus for serial data transmission. Such a CAN bus is normally a two-wire bus and can be implemented with copper wires or through glass fibers.

Quite generally, it is also possible to transmit the respective data via the voltage supply line. According to the present disclosure, it is especially suggested that the connections for the field bus and the voltage supply line should be implemented as separate connections.

In order to simplify the structural design of the control and supply unit in its entirety, the communication interface and the voltage supply connection can be defined by a supply and communication assembly. The latter can be arranged as a separate unit within the unit housing and it can be connected to the other assemblies within said unit housing, such as the auxiliary power supply, the motor control unit or the like.

In order to simplify the respective connection between the supply and communication assembly and the other assemblies in the unit housing, the supply and communication assembly can comprise at least outputs for supplying electric power to the motor control unit, the auxiliary power supply, and/or at least one sensor unit of the actuating device.

It is also possible that the supply and communication assembly comprises connections for communication with and/or control of the auxiliary power supply, the motor control unit and/or the sensor unit of the actuating device. The bus connections in question can be adapted to various types of buses, such as a CAN bus, an RS485 bus or the like. This applies analogously also to the outputs for supplying electric power, which can provide different voltages, depending on the voltage required for the respective assembly supplied.

Furthermore, it can be considered to be of advantage when the supply and communication assembly is provided with a ground terminal connected at least to the auxiliary power supply and/or the motor control unit.

In addition, it will be advantageous when an inert gas atmosphere is provided in the unit housing. This inert gas atmosphere may, for example, be a nitrogen atmosphere under a pressure of 1 to 2 bar, although in some cases the atmosphere may have a pressure of more than 2 bar.

In this context, the connection in question can be a connection to a submarine control module for communication and/or voltage supply. It is, however, also possible to provide communication and a supply of voltage via separate connection lines to different control modules or to other control units, in particular to control units on the seabed.

Also, the data concerning the vibrations can be transmitted from the control and supply unit directly to the respective control module and from said control module, for example, to some other station. In addition, the vibration detection means can be configured for interrogation by the ROV, when the latter bridges the connection between the control and supply unit and the actuating device. In this connection, the vibration detection means can be interrogated via the respective communication interface of the connecting means of the control and supply unit. This applies analogously also to vibration detection means which are not arranged within or on the control and supply unit but are only connected thereto for the transmission of respective data and for the purpose of power supply.

BRIEF DESCRIPTION OF THE DRAWINGS

In the following, an advantageous embodiment of the present disclosure will be explained in more detail on the basis of the figures added in the drawing, in which.

DETAILED DESCRIPTION

Figure 1:
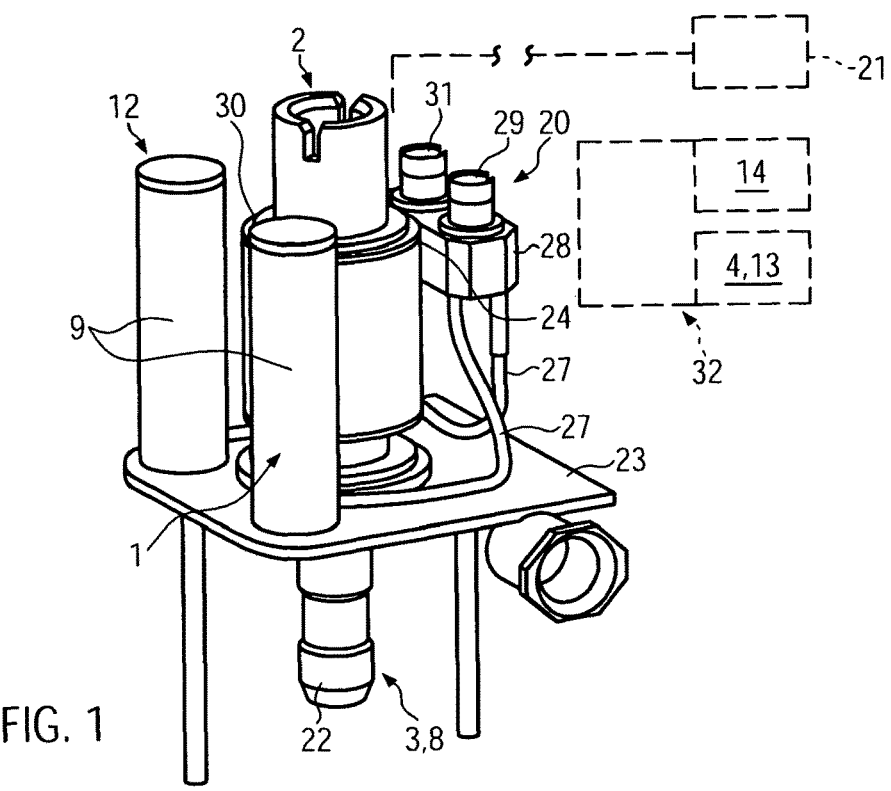
FIG. 1 shows a perspective view of an actuating device for a choke with the control and supply unit according to the present disclosure.

In the drawings and description that follow, like parts are identified throughout the specification and drawings with the same reference numerals. The drawings are not necessarily to scale. Certain features of the invention may be shown exaggerated in scale or in somewhat schematic form and some details of conventional elements may not be shown in the interest of clarity and conciseness. The invention is subject to embodiments of different forms. Some specific embodiments are described in detail and are shown in the drawings with the understanding that the disclosure is to be considered an exemplification of the principles of the invention and is not intended to limit the invention to the illustrated and described embodiments. The different teachings of the embodiments discussed below may be employed separately or in any suitable combination to produce desired results. The terms "connect," "engage," "couple," "attach," or any other term describing an interaction between elements is not meant to limit the interaction to direct interaction between the elements and may also include indirect interaction between the elements described. The various characteristics mentioned above, as well as other features and characteristics described in more detail below, will be readily apparent to those skilled in the art upon reading the following detailed description of the embodiments, and by referring to the accompanying drawings.

FIG. 1 shows a perspective side view of an actuating device 2 for a choke 3, which is only shown in the form of a choke insert 22, as an application device 8. The actuating device 2 comprises at least a thread drive having a drive unit associated therewith, and in particular also a position sensor, all said components being arranged within a cylindrical housing. The choke insert 22 is longitudinally displaceable by means of the thread drive.

Other devices applied in the field of oil and natural gas production are, for example, a valve, a blow-out preventer or other units of this type. Directly adjacent the actuating device 2, a control and supply unit 1 according to the present disclosure is arranged on a base plate 23. This control and supply unit 1 is of redundant design so that a second control and supply unit 12 is arranged directly adjacent said first unit and in parallel relationship therewith. The control and supply units 1 and 12, respectively, have a unit housing 9. Also this unit housing 9 is cylindrical.

The respective unit housings 9 are connected to a plug connection module 20 via a cable connection 27. When seen relative to the unit housings 9, this plug connection module 20 is arranged on the opposite side of the actuating device 2. The plug connection module 20 is releasably connected, via a connection housing 28, to an outer side of a respective housing 30 of the actuating device 2. Two plug connection devices 29 and 31 are arranged on an upper side of the connection housing 28. Analogously to the two unit housings 9, these plug connection devices are of redundant design, each of these plug connection devices being connected to a respective unit housing 9 via the cable connection 27.

The plug connection module 20 provided with the plug connection devices 29 and 31 serves, firstly, for connection to the control module 21, which is indicated by a broken line in FIG. 1 and which is also arranged below the seal level and, in particular, on the seabed.

Secondly, the plug connection devices 29 and 31 serve for connection to a remotely controllable vehicle, such as a remote operated vehicle (ROV) 32. This ROV 32 can be used not only for transporting the whole unit shown in FIG. 1 and for conveying said unit to or removing it from its usage site, but also for bridging the control and supplying the actuating device by the control and supply unit. This will be done especially in cases where the respective control and supply unit is no longer in working order. For this purpose, the ROV 32 may be provided with special units such as the supply and communication assembly 14 and the auxiliary power supply 4 or the motor control unit 13. In this way, the function of the control and supply unit 1 can be replaced by the ROV 32.

The respective control and supply by the ROV 32 corresponds in this connection to the control and supply through the control and supply unit 1, 12 as described in the following making reference to FIG. 2.

A respective electric connection between the plug connection module 20 and the actuating device 2 is established via a coupling means or coupler 24 between the connection housing 28 and the housing 30 of the actuating device 2. Also the control and the supply of the actuating device 2 by the control and supply units 1 and 12, respectively, is effected via this coupling means or coupler 24.

The broken line in FIG. 1 represents a connection to a control module 21, which is also arranged below the seal level and, in particular, on the seabed.

The whole unit shown in FIG. 1 can be transported by, for example, an ROV and it can be conveyed to and removed from its usage site.

Figure 2:
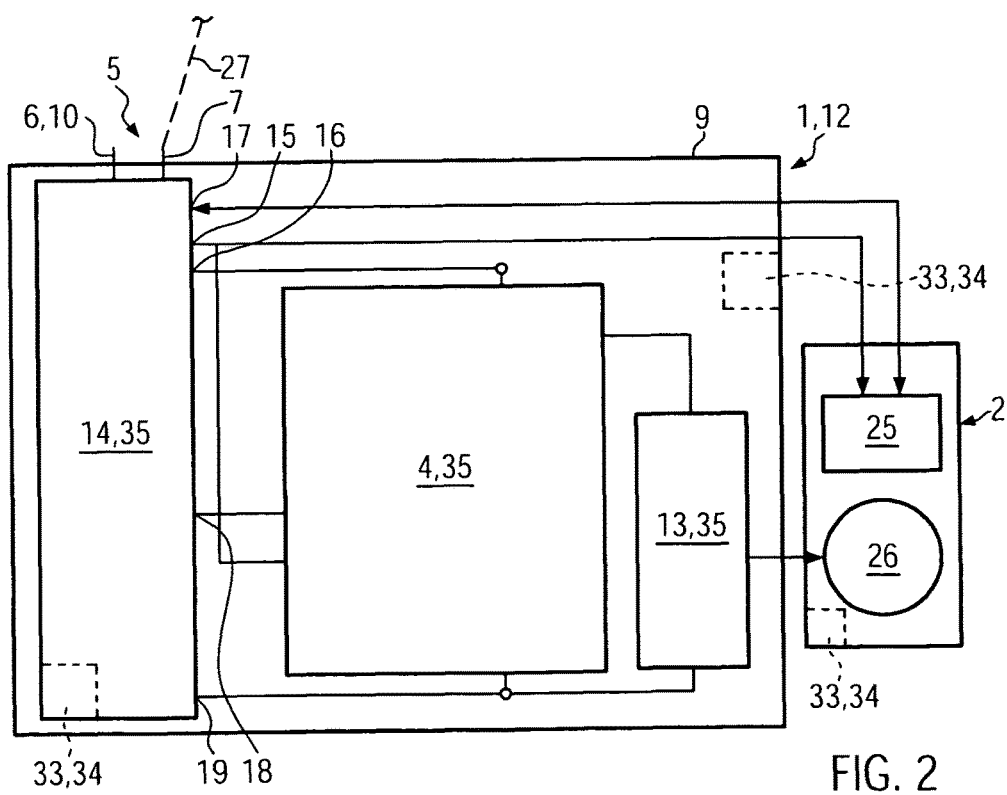
FIG. 2 shows a block diagram of the control and supply unit and of the actuating device.

FIG. 2 shows a block diagram of the unit according to FIG. 1. Various assemblies are arranged within the respective unit housing 9 of the control and supply units 1 and 12. A first assembly is a supply and communication assembly 14. This supply and communication assembly 14 comprises the respective terminals and the connecting means or connector 5 contacted via the cable connection 27 according to FIG. 1.

The connecting means or connector 5 comprises a communication interface 6 and a voltage supply connection 7. The cable connection 27, which is connected to the voltage supply connection 7, is shown at said voltage supply connection. This cable connection 27 extends, for example, up to the plug connection module 20.

The communication interface 6 may be implemented as a field bus interface and is especially used for connecting a CAN bus thereto.

The voltage supply connection 7 is for example a DC voltage connection for a specific wattage, such as 48 W, and for a specific electric voltage or electric voltage range, such as 20-27 VDC or the like.

The supply and communication assembly 14 is provided with additional connections within the unit housing. These connections may include, for example, two terminals 15, 16 for supplying electric power to an auxiliary power supply 4 and a sensor unit 25 of the actuating device 2. The sensor unit 25 may also comprise different sensors for position determination, temperature detection or the like.

In addition, the supply and communication assembly 14 is provided with bus connections 17 and 18 through which data are exchanged with the auxiliary power supply 4 or the sensor unit 25. Bus connection 17 may comprise an RS485 bus connection and bus connection 18 may comprise a CAN bus connection.

Via the bus connection 18 and through the auxiliary power supply 4, it is also possible to control the respective motor control unit 13. This motor control unit 13 is connected to respective motors, which are only shown schematically in FIG. 2 and which are identified by reference numeral 26.

The respective terminals 15 and 16 used for the purpose of electric supply can provide different wattages and voltages. In addition, the auxiliary power supply 4 can be connected to the supply terminal 16 of the supply and communication assembly 14 for the purpose of recharging and it can also be connected to the terminal 15, which is also associated with the sensor unit 25.

Finally, the supply and communication assembly 14 is also provided with a ground terminal 19, which is connected to both the auxiliary power supply 4 and the motor control unit 13.

Within the unit housing 9, an inert gas atmosphere may exist, such as a dry nitrogen atmosphere with a pressure of 1 to 2 bar, although in some cases the atmosphere may have a pressure of more than 2 bar.

In FIG. 2, a vibration detection means or vibration detector 33 comprising at least one vibration sensor 34 is shown within the unit housing 9. A first vibration detection means or vibration detector 33 is associated with the supply and communication assembly 14 of the control and supply unit 1 defining a component 35, and can be part of the respective component 35. A further vibration detection means or vibration detector 33 can be arranged within the unit housing 9 as an additional component. Respective connections between the supply and communication assembly 14 and this vibration detection means 33 are not shown in FIG. 2 for the sake of clarity. Normally, such a connection is established for the purpose of voltage supply as well as for an exchange of data. In addition, it is possible to provide a suitable voltage supply line also between the auxiliary power supply 4 and the vibration detection means 33. The data detected by the respective vibration sensor 34 and possibly processed by the additional vibration detection means 33 can be transmitted via the supply and communication assembly 14 from the control and supply unit 1 and can then be transmitted to the outside via respective cable connection 27 and the communication interface 6, respectively.

It is also possible to associate the vibration detection means 33 or an additional means of this kind with the actuating device 2. Also in this case, data concerning the vibrations can be transmitted via the control and supply unit 1, for example, to an external control module 21 or to some additional unit above the sea level.

Another possibility is that, in cases where an ROV 32 is contacted and the actuating device 2 is supplied by said ROV, respective data are transmitted from the vibration detection means 33 to the ROV 32 and its supply and communication assembly 14.

The information can be interrogated from the vibration detection means 33 or from the vibration sensor 34 cyclically and/or sequentially.

The control and supply unit 1 according to the present disclosure serves to supply the actuating device 2 with data as well as with electric power. The respective terminals can be standardized so as to satisfy in particular the demands specified in SIIS. Making use of the control and supply unit 1, the actuating device 2 can be operated and controlled easily. The control and supply unit 1 comprises all the assemblies which are required for controlling the actuating device 2 as well as for supplying electric power thereto. The auxiliary power supply 4 is rechargeable and is especially used for compensating power shortages or shortfalls. Sufficient power is provided for the idling state of the respective motors of the actuating device 2 as well as for operating said motors when they are in operation.

The control and supply unit 1 is mounted together with the actuating device 2 and can easily be transported together therewith. That is, the whole unit shown in FIG. 1 can be transported, for example by ROV 32 and retrieved for the purpose of maintenance or repair.

A characteristic of the control and supply unit 1 according to the present disclosure is that the control and supply unit 1 is separate from the plug connection module 20, said plug connection module 20 being directly associated with the actuating device 2. The control and supply unit 1 is connected to the plug connection module 20 via a cable connection, which is adapted to be connected to the external control module 21 as well as to the ROV 32. This ROV 32 serves to bridge the connection and control with or through the control and supply unit 1 and replaces the latter, so that the supply of electric power to the actuating device 2 can be continued directly by the ROV 32 and so that the actuating device 2 is controlled and supervised via a suitable exchange of data with the ROV 32.

While specific embodiments have been shown and described, modifications can be made by one skilled in the art without departing from the spirit or teaching of this invention. The embodiments as described are exemplary only and are not limiting. Many variations and modifications are possible and are within the scope of the invention. Accordingly, the scope of protection is not limited to the embodiments described, but is only limited by the claims that follow, the scope of which shall include all equivalents of the subject matter of the claims.

What is claimed is:

1. A control and supply unit for an actuating device of a choke, a valve, a blow-out preventer or a control device applied in the field of oil and natural gas production, the unit comprising:
a vibration detection means to detect vibrations that are internal to the actuating device or the control device, wherein the vibrations in the actuating device or the control device are generated by a condition of the actuating device or the control device that reacts to a conveyed flow;
wherein the control and supply unit is configured to operate the actuating device in direct response to an evaluation that indicates at least one of an amplitude or frequency component of the detected vibrations is above a predetermined threshold, wherein the predetermined threshold is based on the condition.

2. A control and supply unit for an actuating device of a choke, a valve, a blow-out preventer or a control device applied in the field of oil and natural gas production, the unit comprising:
a vibration sensor to detect vibrations that are internal to the actuating device or the control device, wherein the vibrations in the actuating device or the control device are generated by a condition of the actuating device or the control device that reacts to a conveyed flow;
a vibration evaluation unit coupled to the vibration sensor to produce an indication of at least one of an amplitude or a frequency component based on the internal flow vibrations detected by the vibration sensor; and
a motor control unit to control the actuating device;
wherein the control and supply unit is configured to cause the motor control unit to operate the actuating device in direct response to an evaluation that indicates at least one of the amplitude or the frequency component of the detected vibrations is above a predetermined threshold, wherein the predetermined threshold is based on the condition.

3. The control and supply unit according to claim 2, wherein the vibration sensor is associated with a component of the control and supply unit.

4. The control and supply unit according to claim 2, wherein the vibration sensor is associated with the actuating device.

5. The control and supply unit according to claim 2, wherein the vibration sensor is associated with a plug connection module.

6. The control and supply unit according to claim 2, wherein the vibration sensor is part of a supply and communication assembly of the control and supply unit.

7. The control and supply unit according to claim 2, wherein the vibration sensor is configured to detect vibrations in the direction of three axes that are arranged at right angles to one another.

8. The control and supply unit according to claim 2, wherein the vibration sensor is configured for cyclic and/or sequential interrogation.

9. The control and supply unit according to claim 2, further comprising:
at least one auxiliary power supply; and
a connector comprising:
a communication interface to couple to a field bus to exchange data; or
a voltage supply connection to couple to a voltage supply line to supply voltage;
wherein the auxiliary power supply is rechargeable.

10. The control and supply unit according to claim 9, wherein the unit is implemented separately from the actuating device and is provided with a unit housing having arranged therein at least the communication interface, the auxiliary power supply and a motor control unit.

11. The control and supply unit according to claim 9, wherein the field bus is a CAN bus.

12. The control and supply unit according to claim 9 wherein the connector comprises the communication interface and the voltage supply connection and terminals of the field bus and the voltage supply are implemented separately.

13. The control and supply unit according to claim 10, wherein the communication interface and the voltage supply connection are formed on a supply and communication assembly, said supply and communication assembly comprising connections for supplying electric power to the motor control unit, the auxiliary power supply or at least one sensor unit of the actuating device.

14. The control and supply unit according to claim 10, wherein the supply and communication assembly comprises bus connections for communication with or control of the auxiliary power supply, the motor control unit or the sensor unit of the actuating device.

15. The control and supply unit according to claim 10, wherein the supply and communication assembly comprises a ground terminal connected at least to the auxiliary power supply or the motor control unit.

16. The control and supply unit according to claim 9, wherein the connector is connected via a cable connection to a separate plug connection module arranged on the actuating device.

17. The control and supply unit according to claim 16, wherein the plug connection module comprises a connection housing and at least one plug connection device.

18. The control and supply unit according to claim 17, wherein a coupler to transmit electric power or data is implemented between the connection housing and the actuating device.

19. The control and supply unit according to claim 16, wherein the plug connection module is configured to be connected to an external control module or a remotely operated vehicle.

20. The control and supply unit according to claim 16, wherein the plug connection module is configured for connection of a vehicle voltage supply line or a vehicle data line for supply with electric power by and for an exchange of data with the vehicle.

21. The control and supply unit according to claim 2 wherein the vibration evaluation unit is configured to produce an indication of wear when at least one of the amplitude or frequency components of the detected vibrations exceeds a predefined threshold for that component.

* * * * *